(12) United States Patent
Liu et al.

(10) Patent No.: US 10,289,777 B2
(45) Date of Patent: May 14, 2019

(54) INTEGRATED CIRCUIT DESIGNS BASED ON TEMPERATURE DISTRIBUTION DETERMINATION

(71) Applicant: TAIWAN SEMICONDUCTOR MANUFACTURING COMPANY, LTD., Hsinchu (TW)

(72) Inventors: Sa-Lly Liu, Hsinchu (TW); Szu-Lin Liu, Hsinchu (TW); Jaw-Juinn Horng, Hsinchu (TW); Fu-Lung Hsueh, Kaohsiung (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 929 days.

(21) Appl. No.: 14/308,242

(22) Filed: Jun. 18, 2014

(65) Prior Publication Data
US 2015/0370937 A1    Dec. 24, 2015

(51) Int. Cl.
*G06F 17/50* (2006.01)

(52) U.S. Cl.
CPC ...... *G06F 17/5036* (2013.01); *G06F 2217/80* (2013.01)

(58) Field of Classification Search
CPC .......... G06F 17/5036; G06F 2217/80
USPC .......................................................... 703/14
See application file for complete search history.

(56) References Cited

U.S. PATENT DOCUMENTS

| | | | |
|---|---|---|---|
| 8,539,408 B1* | 9/2013 | Cheng | G06F 17/5036 716/110 |
| 8,921,203 B2* | 12/2014 | Karlin | H01L 29/66007 257/415 |
| 2009/0282379 A1* | 11/2009 | Singh | G06F 17/5045 716/119 |

OTHER PUBLICATIONS

Swahn, B. and Hassoun, S. "Electro-Thermal Analysis of Multi-Fin Devices" in: IEEE Transactions on Very Large Scale Integration (VLSI) Systems, vol. 16, No. 7, pp. 816-829, (Jul. 7, 2008) [retrieved on Jan. 31, 2017]. Retrieved from: IEEE Xplorer. <DOI: 10.1109/TVLSI.2008.2000455>.*

(Continued)

*Primary Examiner* — Hugh M Jones
(74) *Attorney, Agent, or Firm* — Hauptman Ham, LLP

(57) ABSTRACT

A method comprises constructing thermal block representations of one or more circuit components or one or more sub-components of the one or more circuit components in an integrated circuit based, at least in part, on defined component parameters. The component parameters describe the one or more sub-components of the one or more circuit components. The thermal block representations have at least one simulation node. The method also comprises supplying a current using at least one current source or voltage controlled current source in a performance simulation. The current is supplied to a thermal path between a first simulation node and a second simulation node. The method further comprises determining a temperature distribution between the first simulation node and the second simulation node based on the current, a first determined voltage at the first simulation node, and a second determined voltage at the second simulation node.

20 Claims, 16 Drawing Sheets

(56) References Cited

OTHER PUBLICATIONS

Cheng, Ming-Cheng et al., "An Effective Thermal Model for FinFET Structure", IEEE Transactions on Electron Devices, vol. 6, No. 1, Jan. 2014, pp. 202-206.

Karim, M. A., et al., "Extraction of Isothermal Condition of Thermal Network in UTBB SOI MOSFETs", IEEE Electron Device Letters, vol. 33, No. 9, Sep. 2012, pp. 1306-1308.

* cited by examiner

| delta T | Distance(um) | | |
|---|---|---|---|
| VIA#/Side | 0.1 | 5 | 10 |
| (A) No via holes | 51.2 | 60.2 | 72.3 |
| (B) 4 but NC | 39.2 | 60.2 | 72.3 |
| (C) 4 connected | 17.1 | 40.8 | 52.2 |

```
*** Global Setting
.global  th_pwr1

*** Parameters for NF, nfin, VDD & IBIAS
.param   nf =3
.param   nfin =4
.param   vbias =0.8
.param   ibias =0.3308e-3

*** DUT
xmdut0 d1  d1 th_s1 b1 nch_ulvt_mac l=0.020u nfin='nfin' m='nf'

*** Translate Device Power to a pseudo voltage
v_th1  th_s1     s1          0
i_th0  0         th_pwr1     1
r_th0  th_pwr1   0           'v(d1,s1)*i(v_th1)/nfin/nf*1e7'

*** SHE Macro Model
.include therm_mos1x1_0304/therm_mos1x1_0304.cir

*** Electrical Circuit Netlist
Vbs  b1   0     0
Vss  s1   0     0
Vdd  P1   0     vbias
I1   P1   d1    ibias
```

INTEGRATED CIRCUIT DESIGNS BASED ON TEMPERATURE DISTRIBUTION DETERMINATION

BACKGROUND

Device manufacturers are challenged to deliver value and convenience to consumers by, for example, producing integrated circuits that provide quality performance. Integrated circuits often increase in temperature during use, which often limits the performance capability of the integrated circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 15 is a diagram of a user interface, in accordance with one or more embodiments.

DETAILED DESCRIPTION

Figure 1:
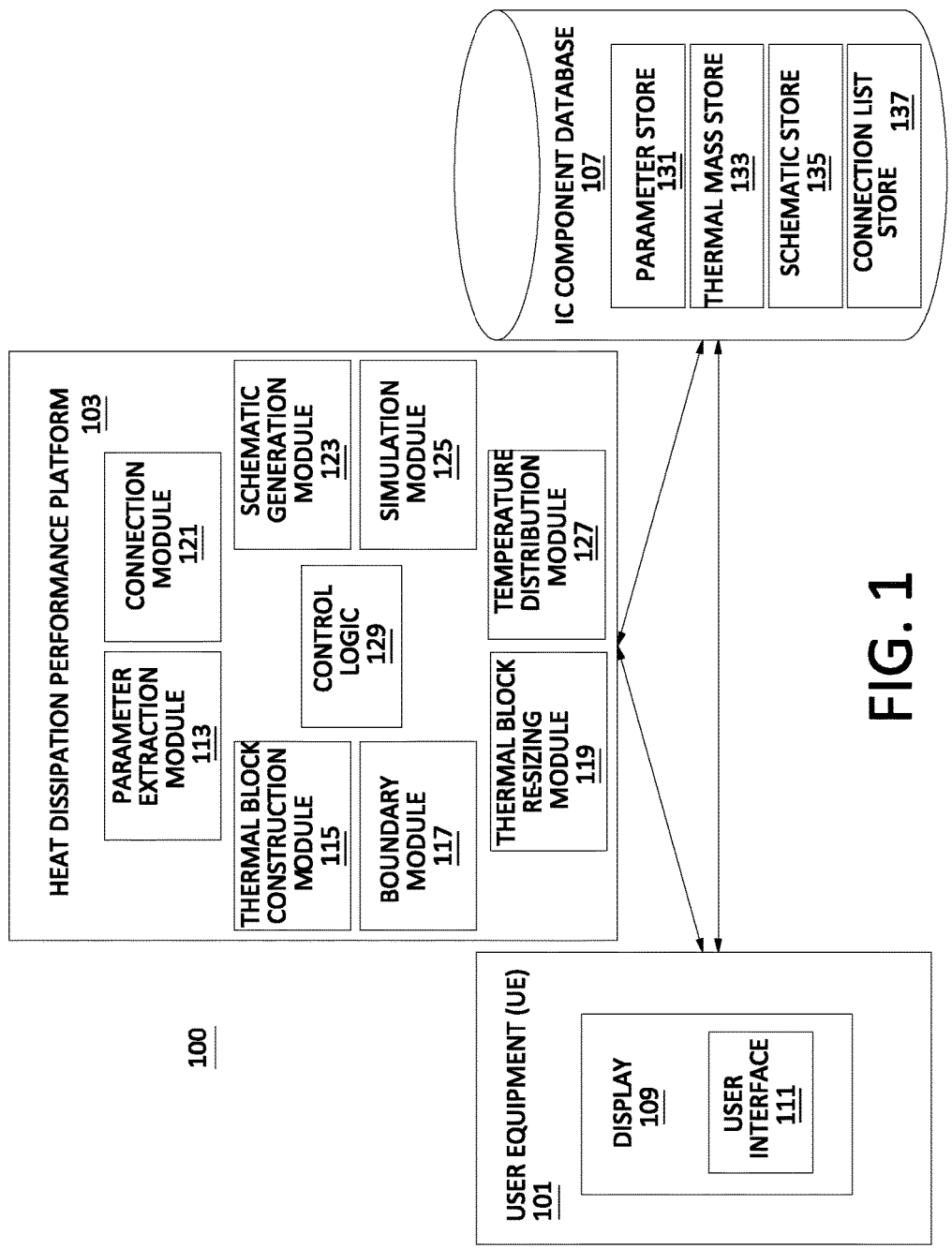
FIG. 1 is a diagram of an integrated circuit performance simulation system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Integrated circuits often increase in temperature during use, which often degrades the performance capabilities of the integrated circuit. For example, self-heating in semiconductor devices, which are included within an integrated circuit as a circuit component or are integrated circuits themselves, has the capability of impacting device reliability, both in bulk and in silicon-on-oxide (SOI). An example semiconductor device that experiences performance degrading self heating is the fin field effect transistor (FINFET). FINFETs are arranged to dissipate most heat into metal interconnects that are actively used in the function of the integrated circuit. Electromigration degradation caused by temperature increase in the metal interconnects, for example, is an issue for device designers. But, some design practices do not focus on specific layout styles to mitigate temperature build-up in the metal interconnects caused by device self heating during use.

Many semiconductor devices comprise, are connected to, or are associated with, one or more of a substrate, a source, a drain, a guard ring, an oxide defined region, or epitaxial layer, over the source or drain, an oxide defined region, or epitaxial layer, over the guard ring, a metal interconnect, vias coupled to the oxide defined region over the source or drain and the oxide defined region over the guard ring, and a gate. Some semiconductor devices have a space between the oxide defined region over the source or drain and the oxide defined region over the guard ring. In use, these semiconductor devices generate heat. A majority of the generated heat dissipates from the source or drain to the metal interconnect and to the epitaxial layer. Some of the heat eventually passes to the guard ring. Such heat dissipation is often times ineffective to avoid the performance degradation the self-heating effect has on device performance, because the FINFET structure is mostly surrounded by dielectric material that has poor thermal conductive properties. Phonon boundary scattering of a FINFET structure further impairs a FINFET's thermal conductivity, which makes heat dissipation more difficult.

Because there are a limited number of heat dissipation paths, and because most of the heat passes to the metal interconnects, performance of the semiconductor device is greatly affected. For example, even a temperature rise of as little as 10 degrees Celsius can impact the performance of the device such as by causing electromigration degradation. Additionally, self-heating has the capability of impacting other devices of an integrated circuit within a few micrometers of the generated heat.

FINFETs have small lengths sometimes ranging from approximately 7 nm to 16 nm or 20 nm. In use, FINFETS generate heat at the drain where the electrical field is the strongest, but almost identically heats both the source and the drain. Many FINFET layout designs, however, do not sufficiently dissipate heat, because some FINFET layout designs lack dissipation paths that divert heat to the ambient, to the substrate, to a guard ring, to dummy metals, or to other suitable heat dissipation features or circuit components. As such, self-heat generated in a device impacts the electrically conductive portions of the semiconductor device such as interconnect metal layers that are electrically connected within the device, or in close proximity to one another. In addition, the electrically conductive portions of the semiconductor device, such as interconnect metal layers, also generate heat, for example, by way of Joule heating, when conducting current. Joule heating is detrimental to metal interconnect performance. The generated heat also often propagates to the gate, which further hinders device performance.

Some integrated circuit design systems employ performance simulations that estimate device performance. Some simulations include, for example, Simulation Program with Integrated Circuit Emphasis (SPICE) models, or other suitable device performance simulations, that employ the Berkley Short Channel Insulation Gate Field Effect Transistor Model for Silicon on Insulator Devices (BSIMSOI) or the Berkeley Short-Channel IGFET Model—Common Multi-Gate (BSIMCG) to simulate how a designed integrated circuit will perform under predetermined simulation conditions.

To alleviate performance degradation caused by the self heating effect, such as heat generated at FINFET drain junctions, heat generated at a device interconnect through Joule heating, or other forms or locations of heat generation, some integrated circuits are configured to include heat sinks. Heat flows to the heat sink via back end of line devices or connections and/or the substrate over which the integrated circuit is formed. Heat ultimately dissipates to the ambient surrounding the integrated circuit. Usually, some performance simulation models, as previously mentioned in [0024], are incapable of determining heat distribution among neighboring devices and materials such as a heat sink. Some performance simulation models are helpful only if there is a known thermal steady state, because there is no thermal path for an outbound heat flux.

Some integrated circuit performance simulation systems employ methods such as a finite component methodology (FEM) that use the Boltzmann transport equation (BTE) to simulate heat transport by phonons. FEM simulations, however, are time consuming for FINFET-type structures.

FIG. 1 is a diagram of an integrated circuit performance simulation system 100 that models a temperature distribution through a designed IC, in accordance with one or more embodiments. The integrated circuit performance simulation system 100 is configured to subject a designed integrated circuit to one or more of a heat dissipation performance simulation and/or a device performance simulation. The integrated circuit performance simulation system 100 comprises a user equipment (UE) 101 having connectivity to a heat dissipation performance platform 103, and an integrated circuit component database 107.

The UE 101 is any type of mobile terminal, fixed terminal, or portable terminal including a desktop computer, laptop computer, notebook computer, netbook computer, tablet computer, wearable circuitry, mobile handset, or combination thereof. The UE 101 comprises a display 109 by which a user interface 111 is displayed. A user interacts with the heat dissipation performance platform 103 by way of user interface 111.

The heat dissipation performance platform 103 is a set of computer readable instructions that, when executed by a processor, simulates the heat dissipation performance of a designed IC, outputs simulation results, and optionally graphically maps the simulation results for visual display. In some embodiments, the heat dissipation performance platform 103 is a SPICE modeling engine. In some embodiments the heat dissipation performance platform 103 is configured to interface with a SPICE modeling engine. In some embodiments, the heat dissipation performance platform 103 is a part of a SPICE modeling engine. In some embodiments, the heat dissipation performance platform 103 is executed by a SPICE modeling engine or an otherwise suitable device performance simulation engine.

The heat dissipation performance platform 103 comprises a plurality of computing modules including a parameter extraction module 113, a thermal block construction module 115, a boundary module 117, a thermal block re-sizing module 119, a connection module 121, a schematic generation module 123, a simulation module 125, a communication module 127 by which the heat dissipation performance platform 103 communicates with the UE 101 and the integrated circuit component database 107, and a control logic 129 that governs communications between the various modules of the heat dissipation performance platform 103.

Integrated circuit component database 107 is a memory capable of being queried by the heat dissipation performance platform 103 based on a user interaction with the user interface 111. The integrated circuit component database comprises a parameter store 131, a thermal mass store 133, a schematic store 135, and a connection list store 137.

The UE 101, heat dissipation performance platform 103, and integrated circuit component database 107 are together configured as a special purpose computer system. In some embodiments, one or more of the UE 101, heat dissipation performance platform 103, and integrated circuit component database are unitarily embodied in the UE 101. The UE 101, accordingly, comprises a processor by which the heat dissipation performance platform 103 is executed. In some embodiments, one or more of the UE 101, heat dissipation performance platform 103 or integrated circuit component database 107 are configured to be located remotely from the each other. If located remotely, the heat dissipation performance platform 103 is executed by a processor that is also positioned remotely from the UE 101 such as a processor that is embodied within another UE 101.

By way of example, the UE 101, heat dissipation performance platform 103, and integrated circuit component database 107 communicate by wired or wireless communication connection and/or one or more networks such as a wired data network, a wireless network, a telephony network, or combination thereof.

Based on one or more user interactions with the user interface 111, an instruction is received that identifies a designed integrated circuit as a device under test. The heat dissipation performance platform 103 determines the temperature distribution through the designed integrated circuit (i.e., the device under test) and models the heat dissipation performance of the designed IC. The designed integrated circuit under test, for example, has one or more circuit components that include one or more sub-components.

Circuit components or sub-components comprise, for example, resistors, transistors, wires, capacitors, switches, nodes, interconnects, vias, gates, sources, drains, doped regions, channels, or other suitable circuit components or sub-components. The one or more interactions with the user interface 111 include, for example, inputting one or more circuit component parameters such as a length, a width, a depth, a spacing, a material, a location, a k-value, a quantity or other suitable descriptive parameter that describes a circuit component or any sub-components thereof. Alternatively, heat dissipation performance platform 103, by way of the parameter extraction module 113 and/or the parameter store 131, extracts the one or more circuit component parameters from a designed IC. For example, one or more circuit component parameters are capable of being determined by the parameter extraction module 113 based on information stored in the parameter store 131 of the integrated circuit component database 107, or based on a processing of the designed integrated circuit that is under test. One or more circuit components included in the designed IC, for example, might already have known circuit component parameters stored in the parameter store 131 that are capable of being extracted for use by the heat dissipation performance platform 131 in one or more simulations.

The heat dissipation performance platform 103, by way of the simulation module 125, optionally subjects the designed integrated circuit to a device performance simulation to determine the designed IC's potential performance capabilities, or at least the performance capabilities of one or more circuit components included in the designed IC. The device performance simulation is optionally conducted in addition to the heat dissipation performance simulation. In some embodiments, the device performance simulation is performed before or after the heat dissipation performance simulation. In some embodiments, the device performance simulation is performed concurrently with the heat dissipation performance simulation.

Figure 2:
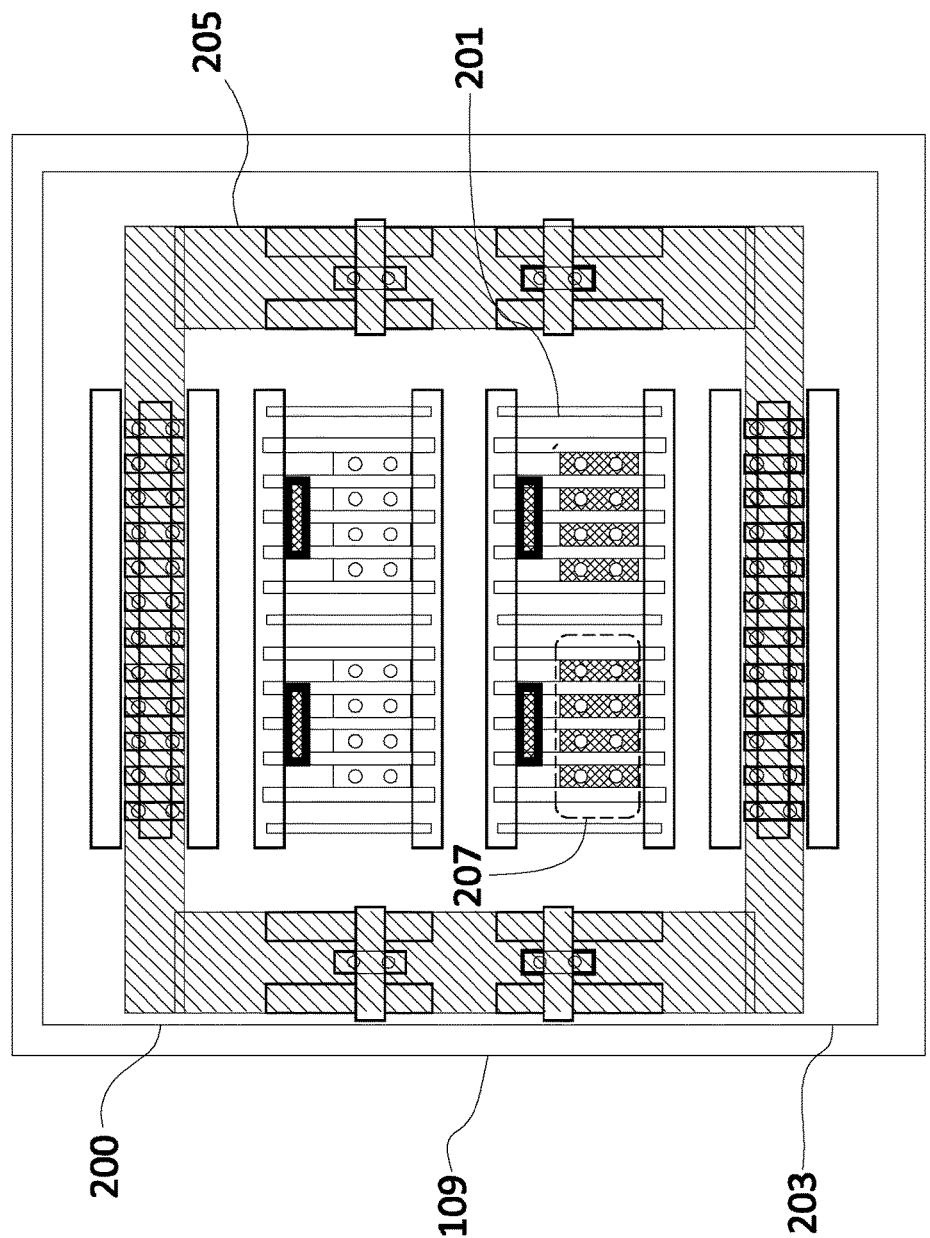
FIG. 2 is a diagram of an integrated circuit under test, in accordance with one or more embodiments.

FIG. 2 is a diagram of an integrated circuit 200 under test and viewable via display 109, in accordance with one or more embodiments. Integrated circuit 200 comprises circuit components 201 over a substrate 203. The circuit components 201 optionally include a guard ring 205 and one or more sub-components 207 such as a source, a drain, an oxide defined region over the source, an oxide defined region, or epitaxial layer, over the guard ring 205, one or more metal interconnects or lines optionally coupled by one or more vias to the oxide defined region over the source and the oxide defined region over the guard ring, a gate, a fin, or other suitable sub-component of a circuit component.

Figure 3:
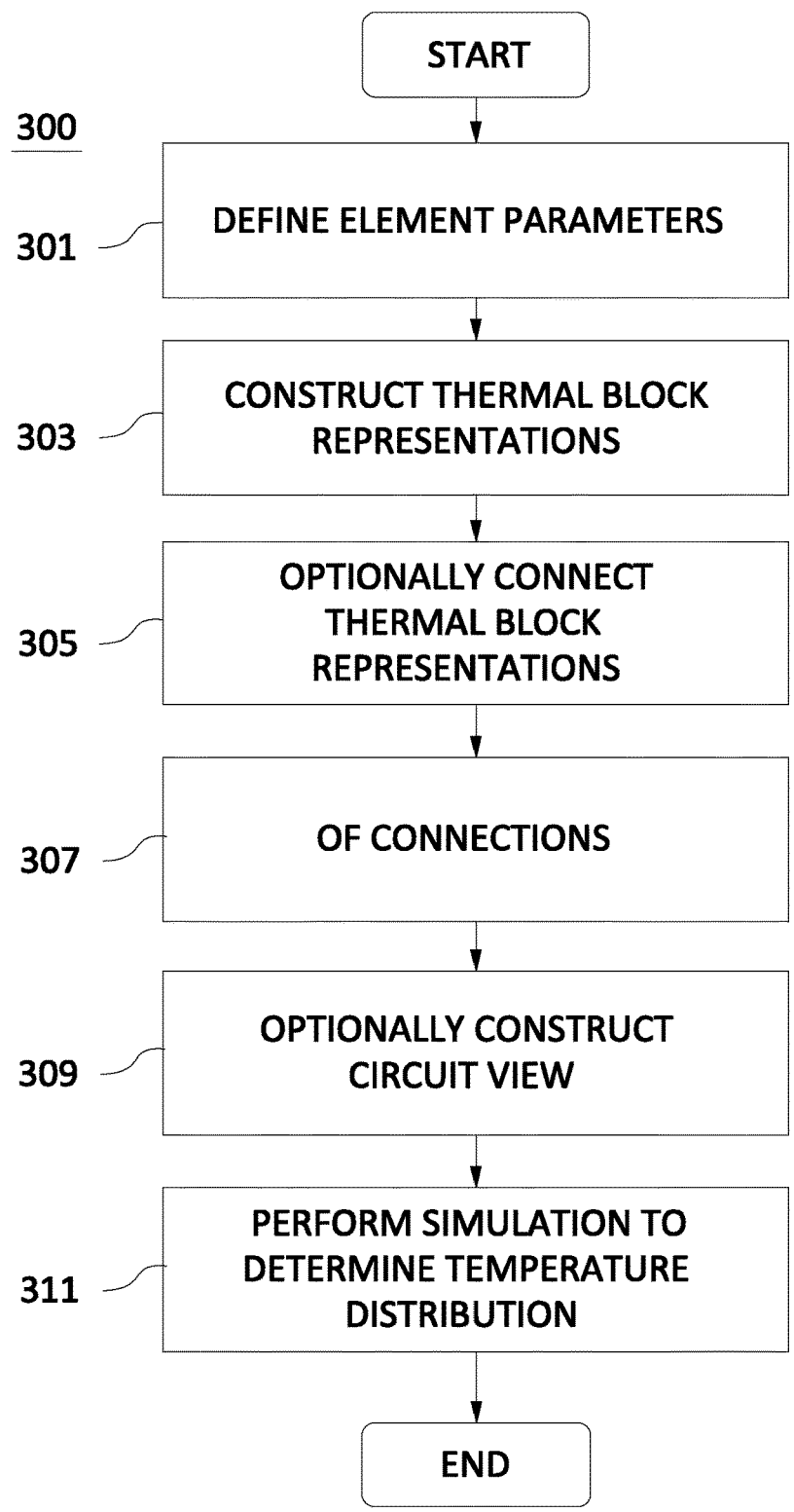
FIG. 3 is a diagram of a method of determining a temperature distribution through an integrated circuit, in accordance with one or more embodiments.

FIG. 3 is a diagram of a method 300 of modeling a temperature distribution through an integrated circuit to determine the heat dissipation performance of a designed integrated circuit, in accordance with one or more embodiments.

The method 300 is executed by the heat dissipation performance platform 103 (FIG. 1), to determine the heat distribution performance of integrated circuit 200 (FIG. 2). The method 300 makes it possible for a circuit designer to evaluate how effective a certain integrated circuit design is with respect to dissipating self-generated heat compared to different integrated circuit designs. In some embodiments, method 300 and/or heat dissipation performance platform 103 are included in an integrated circuit design process in which a given integrated circuit design is selected over different integrated circuit designs based on the evaluation of how effective the given design is with respect to dissipating self-generated heat. In some embodiments, the integrated circuit design process includes generating a layout diagram usable to fabricate a set of masks based on the selected integrated circuit design. In some embodiments, the integrated circuit design process includes manufacturing an integrated circuit by performing one or more lithographic processes, growing processes, etching processes, or other processes based on the layout diagram and/or the set of masks.

In step 301, the heat dissipation performance platform 103 defines one or more circuit component parameters describing one or more sub-components 207 of the one or more circuit components 201. Such parameters include, for example, one or more of sub-component material(s), dimensional sizes (e.g., length, width, height), quantity, distance between like sub-components, k-value, or other suitable information. The heat dissipation performance platform 103 defines the circuit component parameters based on one or more of a user input received by way of user interface 111 (FIG. 1) or by way of an extraction performed by the parameter extraction module 113 (FIG. 1).

In step 303, the heat dissipation performance platform 103 constructs thermal block representations of the one or more circuit components 201 (FIG. 2), or the one or more sub-components 207 (FIG. 2). The thermal block representations are constructed based, at least in part, on the defined component parameters. The thermal block representations are constructed having established component boundaries associated with the one or more circuit components 201 or the one or more sub-components 207. The one or more sub-components 207 of the one or more circuit components 201 included in the integrated circuit 200 are within the component boundary for the respective circuit component of the one or more circuit components 201. The heat dissipation performance platform 103 constructs the thermal block representations using the thermal block construction module 115 and defines the component boundaries using the boundary module 117.

In some embodiments, the thermal block representations of the one or more circuit components 201 are constructed by reducing a quantity of the one or more sub-components 207 of the one or more circuit components 201. For example, if a circuit component 201 comprises a source, a drain, a gate, a plurality of vias, a metal line, an a dielectric layer as sub-components 207, then the circuit component 201 is simplified by representing the circuit component 201 as one or more thermal block representations having a same thermal mass as one or more of the sub-components 207 individually or in some combination, or a same thermal mass as the circuit component 201 as a whole. The quantity circuit components 201 and/or sub-components 207 are thereby reduced to a lesser quantity of thermal block representations that partially or entirely replace the circuit components 201 included in the integrated circuit 200. The heat dissipation performance platform 103, in some embodiments, queries the thermal mass store 133 (FIG. 1) of the integrated circuit component database 107 for thermal mass data associated with the one or more circuit components 201 and/or the one or more sub-components 207. Alternatively, the heat dissipation performance platform 103 determines the thermal mass of a circuit component 201 or a sub-component 207 based on a user input received by way of the user interface 111 or by processing one or more of the circuit component parameters.

The heat dissipation performance simulation is conducted on the thermal block representations. The thermal block representations, which comprise fewer elements compared to the circuit components 201 that the thermal block representations replaced, make it possible to save processing time and system resources. In some embodiments, the thermal block representations also make it possible to determine a temperature distribution between nodes along a thermal path that is independent of an electrically conductive line, because the heat dissipation performance platform 103 is configured to define simulation nodes within the thermal block representations at any position within the defined component boundary regardless of whether that position is electrically conductive.

One or more of the thermal block representations are constructed having at least one simulation node that is used as a reference point to determine the temperature at a particular node or position within the thermal block representation having the at least one simulation node. A temperature distribution through the integrated circuit 200 is modeled based on determined temperatures along at least one thermal path through the integrated circuit 200.

In some embodiments, the thermal block representations have a plurality of thermal paths through and optionally connecting the thermal block representations. At least one thermal path is independent of the one or more electrically conductive circuit components or sub-components such as a metal line or metal layer. In some embodiments, one or more thermal paths include simulation nodes such as an embedded current source at a drain junction or metal line centers that are included in the thermal block representations to model heat generation at these locations.

In some embodiments, the heat dissipation performance platform 103 constructs the thermal block representations by re-sizing at least one of the thermal block representations. The heat dissipation performance platform 103 re-sizes the at least one thermal block representation by way of the thermal block re-sizing module 119 (FIG. 1). The thermal block re-sizing module either expands or contracts the established component boundary associated with the at least one re-sized thermal block representation to align the at least one re-sized established component boundary of the at least one thermal block representation with at least one other established component boundary of another circuit component 201 or sub-component 207. For example, because the thermal block representations are simplified versions of the circuit components 201 represented by the thermal block representations, and because the thermal block representations have an equivalent thermal mass as the circuit components 201 or the sub-components 207 that the thermal block representations replaced, the thermal block representations are re-sizable to align with other thermal block representations, which improves, for example, simulation processing speeds and display clarity. The thermal block re-sizing module 119 changes the established component boundary while maintained the previously defined thermal mass associated with the thermal block representation and/or the circuit component 201 or sub-components 207.

In some embodiments, in addition to constructing thermal block representations of the circuit components 201 and/or the sub-components 207, the thermal block construction module 117 is also configured to construct one or more ambient thermal blocks representative of an ambient environment around the integrated circuit 200. Before, during or after constructing the thermal block representations of the one or more circuit components 201 or the one or more sub-components 207, the heat dissipation performance platform 103 constructs the ambient thermal blocks. The heat dissipation performance platform 103 sets one or more simulation nodes at the outside boundary of the ambient thermal blocks to be a default ambient temperature for the heat dissipation performance simulation.

The one or more ambient thermal blocks are constructed with a predetermined distance to the thermal block representations of the one or more circuit components 201 or the one or more sub-components 207 and the one or more ambient thermal block. The predetermined distance is based on an overall dimensional size of the integrated circuit 200. For example, in some embodiments, the predetermined distance is about 1.0 micrometer. In other embodiments, the predetermined distance is about 1.0 millimeter. In further embodiments, the predetermined distance is greater than about 1.0 millimeter, greater than about 1.0 micrometer and less than about 1.0 millimeter, or less than about 1.0 micrometer. In some embodiments the predetermined distance is proportional with an overall dimensional size such as an area or volume occupied by the integrated circuit 200.

The integrated circuit 200 is over the substrate 203 (FIG. 2). In some embodiments, in addition to constructing thermal block representations of the circuit components 201 and/or the sub-components 207, the thermal block construction module 117 is also configured to construct one or more substrate thermal block representations representative of an ambient environment beneath the integrated circuit 200. Before, during or after constructing the thermal block representations of the one or more circuit components 201 or the one or more sub-components 207, the heat dissipation performance platform 103 constructs the one or more substrate thermal block representations. The heat dissipation performance platform 103 sets one or more simulation nodes at the outside boundaries of the one or more substrate thermal block representations to be the default ambient temperature for the heat dissipation performance simulation. In other words, an ambient node of the substrate thermal block representation is set at the ambient temperature. The positioning of the ambient node reflects a position within the substrate 203 that likely has a temperature that is approximately equal to a temperature that is about 100 micrometers away from the device-side surface of the substrate thermal block representation.

In step 305, the heat dissipation performance platform 103 optionally connects the thermal block representations of the one or more circuit components 201 or the one or more sub-components 207. For example, if a first simulation node is in a first thermal block representation, and a second simulation node is in a second thermal block representation, the first thermal block representation is, in some embodiments, connected with the second thermal block representation. Some circuit components conduct heat differently from others, and the connection between certain circuit components affects how heat flows through the integrated circuit 200. The heat dissipation performance platform 103 connects the thermal block representations using the connection module 121 (FIG. 1).

In step 307, the heat dissipation performance platform 103, by way of the connection module 121, optionally generates a connection list and stores the connections list in the connection store 137 (FIG. 1). The connection list comprises one or more connections between the connected thermal block representations. The connection list is, for example, a netlist that includes the "nets" (i.e., connections or wires) that connect the circuit components 201, the sub-components 207 or the thermal block representations thereof that are included in the integrated circuit 200 under test.

In step 309, the heat dissipation performance platform 103 optionally generates a circuit view or schematic of the integrated circuit 200 by way of the schematic generation module 123 (FIG. 1). The heat dissipation performance platform 103 stores the generated schematic in the schematic store 135 (FIG. 1) for later recall to save processing time and system resources. The schematic generation module 123 generates the circuit view based on the connection list stored in the connection list store 137.

In step 311, the heat dissipation performance platform 103 conducts the heat dissipation performance simulation to determine the temperature distribution through the integrated circuit 200 under test using the simulation module 125 (FIG. 1). The simulation module 125 supplies a current to the integrated circuit 200 at a heat generation location using at least one current source or one voltage-controlled current source in the heat dissipation performance simulation. The current is supplied to a thermal path between a first simulation node and a second simulation node that are set by the heat dissipation performance platform 103 one or more of by way of the thermal block construction module 115 or the simulation module 125. The temperature distribution is determined by the temperature distribution module 127 (FIG. 1) between the first simulation node and the second simulation node is based on the current, a first determined voltage at the first simulation node, and a second determined voltage at the second simulation node.

Though the discussed embodiment refers to a first simulation node and a second simulation node, the thermal block representations comprise numerous quantity of thermal paths that are independent of the metal lines or of electrically conductive materials included in the integrated circuit 200 under test. While the thermal block representations are capable of having an infinite quantity of thermal paths, the heat dissipation performance platform 103 is configured to execute the heat dissipation performance simulation using a predefined quantity of thermal paths such as thermal paths that are associated with heat dissipation directions that are determined to influential to the overall performance of the integrated circuit 200. For example, the thermal paths to be analyzed are optionally capable of being set in relation to a thermal path that includes a drain junction of the integrated circuit 200 under test and/or a center of a metal line of the integrated circuit 200. Such a thermal path optionally extends, for example, from the drain junction to the guard ring 205 (FIG. 2), independent of a metal line or electrically conductive material, to determine how effective the integrated circuit 200 is at dissipating heat from the drain junction to the guard ring 205. Such a thermal path is possible, because thermal flow is not confined by metal lines or electrically conductive materials, unlike electrical current flow.

Thermal flow analysis is analogous to electrical flow analysis. As such, the heat dissipation performance platform 103 determines, by way of the temperature distribution module 127 (FIG. 1), the temperature distribution between the first simulation node A and the second simulation node B by the power passing between these nodes. The heat flow between two points A and B is characterized by thermal impedance:

$$Z_{TH}=(T_A-T_B)/\text{Power} \tag{1}$$

Current flow between two points A and B is characterized by electrical impedance $$Z_{AB}=(V_A-V_B)/\text{Current} \tag{2}$$

As such, the heat dissipation performance platform 103 determines the temperature distribution between the first simulation node A and the second simulation node B based, at least in part, by solving the same set of Kirchhoff current-voltage equations with the heat generation phenomenon modeled by the current supplied by the current source or voltage-controlled current source, the voltage determined at the first simulation node A, and the voltage determined at the second simulation node B represent the temperature at these nodes.

In some embodiments, the heat dissipation performance platform 103 determines the temperature distribution between a plurality of simulation nodes including the first simulation node and the second simulation node. The temperature distribution between the plurality of simulations nodes is based on the current, and a plurality of determined voltages including the first determined voltage and the second determined voltage at the first simulation node and the second simulation node.

In some embodiments, the heat dissipation platform 103 outputs the results of the heat dissipation performance simulation, i.e., the temperature distribution(s) determined by the heat dissipation performance simulation to a spreadsheet, a table, and/or graph that maps the determined temperature distribution graphically between the simulation nodes with respect to a distance from the first simulation node.

Figure 4:
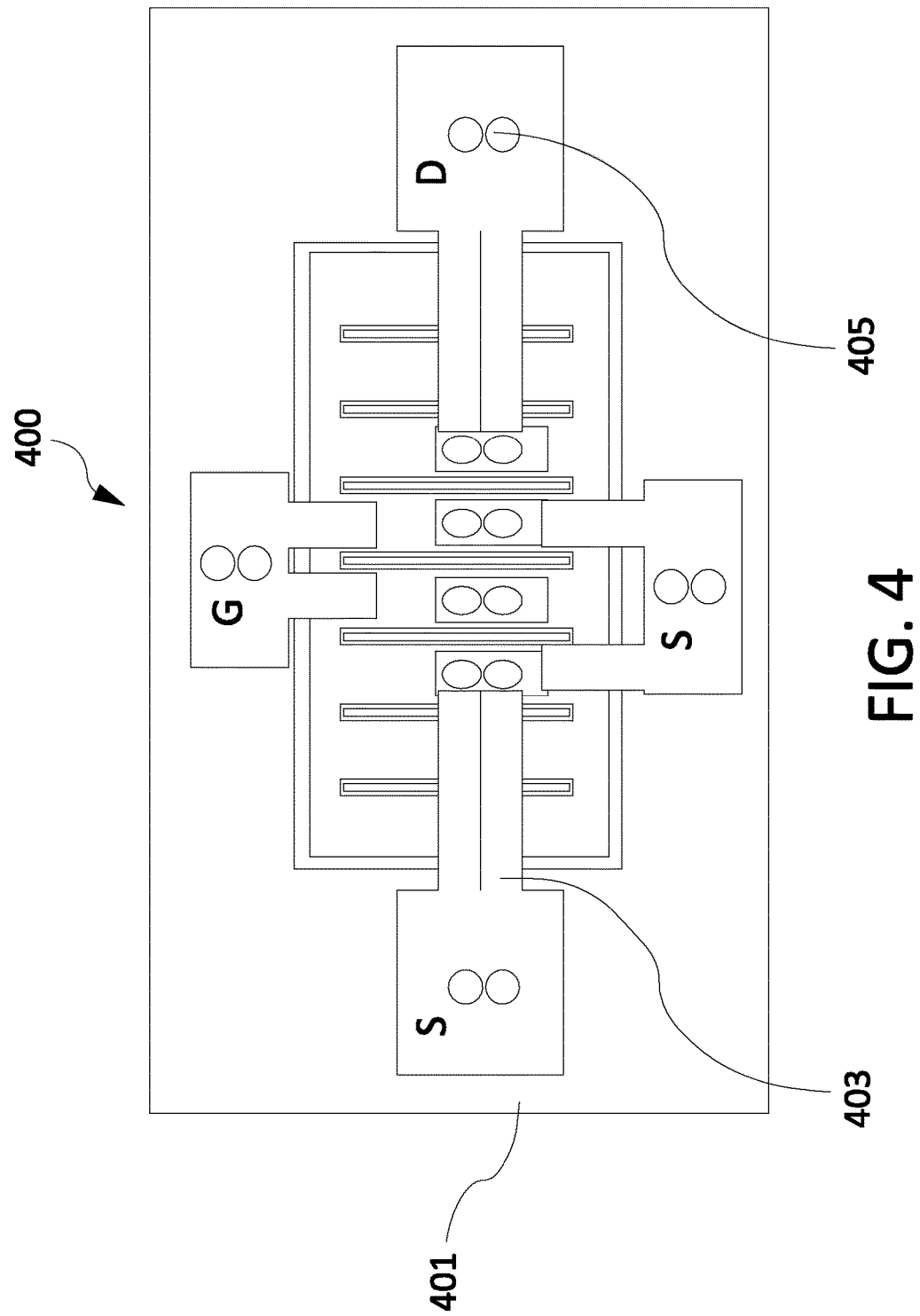
FIG. 4 is a diagram of an integrated circuit having thermal block representations, in accordance with one or more embodiments.

FIG. 4 is a diagram of an integrated circuit 400 that has one or more circuit components represented by thermal block representations 401, in accordance with one or more embodiments. The integrated circuit 400 includes the circuit components 201 (FIG. 2) of integrated circuit 200 (FIG. 2), except for guard ring 205 (FIG. 2). The circuit components 201 are simplified and represented by thermal block representations 401. The sub-components 207 (FIG. 2) are within the integrated circuit 400. The thermal block representations 401 have a same thermal mass as the circuit components 201 and/or sub-components 207 of integrated circuit 200. In this example, the thermal block representations 401 are connected by connections 403 to the contact pads having vias 405 within. The thermal block representations 401 associated with the source S, the drain D, and the gate G of the integrated circuit 400. The thermal block representations 401 are representative of circuit components 201. The contact pads with vias are the heat sink of this embodiment and provide the heat escape path to the ambient for the thermal block representations 401 by way of connections 403. The first simulation node is any place within any of the thermal block representations 401, the connections 403, or the vias 405. The second simulation node is any point within any of the thermal block representations 401, the connections 403, or the vias 405. The pads and vias of integrated circuit 400 represent the guard ring 205 of integrated circuit 200 (FIG. 2).

Figure 5:
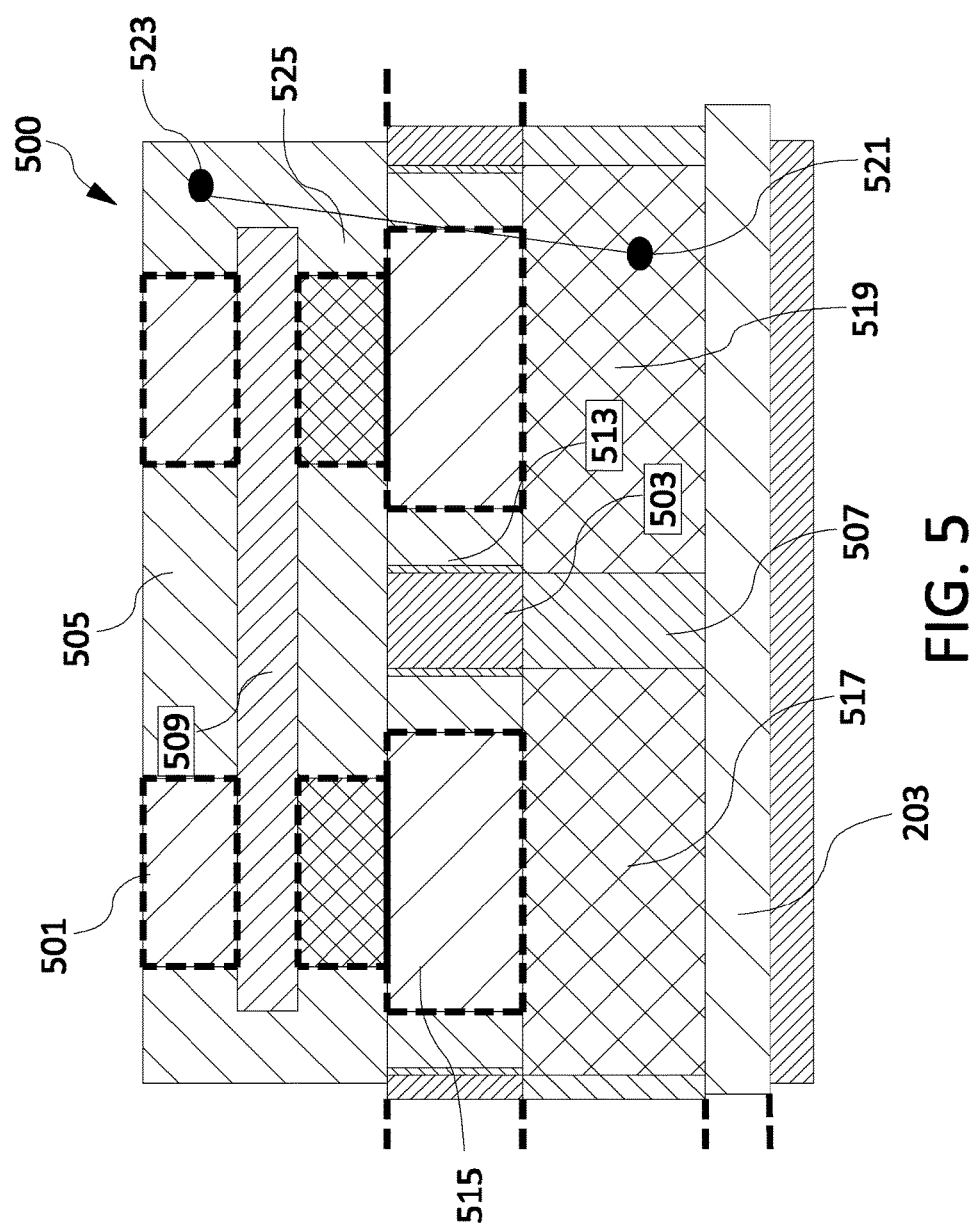
FIG. 5 is a diagram of a circuit component that has one or more sub-components, in accordance with one or more embodiments.

FIG. 5 is a diagram of a circuit component 500 that has one or more sub-components, in accordance with one or more embodiments. The circuit component 500 is a FINFET structure that includes sub-components 207 (FIG. 2) that comprise vias 501, gate structures 503, a dielectric layer 505, fin structures 507, metal lines 509, a dielectric layer 511, spacers 513, an oxide layer 515, a source region 517, a drain region 519 and any other suitable sub-components 207 of a FINFET structure over substrate 203. The sub-components 207 are included in the diagram of circuit component 500 as thermal block representations that are thermally connected to one another. Accordingly, in the heat dissipation simulation, a first simulation node 521 is set at a point within the drain 519 of the circuit component 500, and a second simulation node 523 is set at a point within the dielectric layer 505. A thermal path 525 is between the first simulation node 521 and the second simulation node 523.

Figure 6:
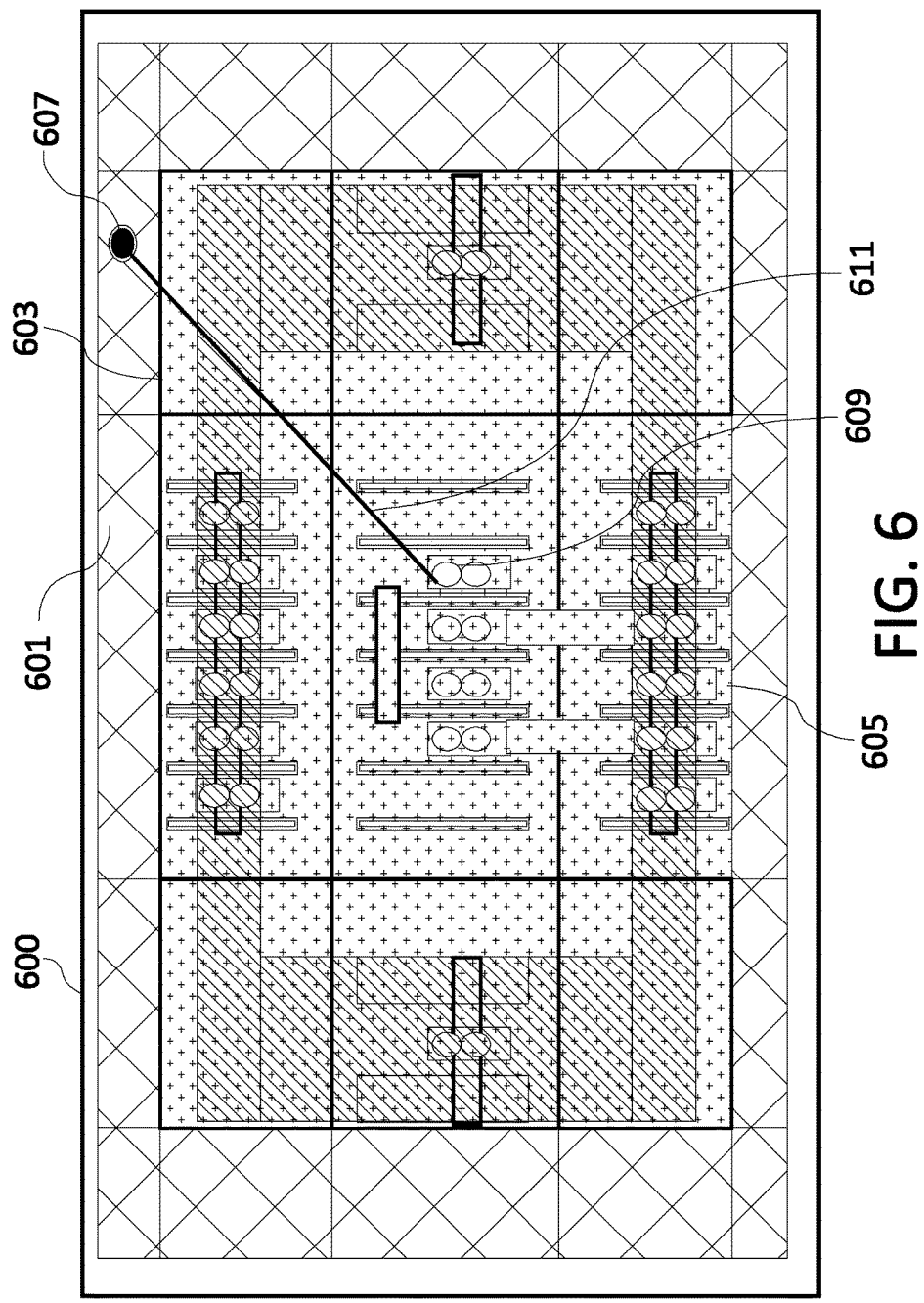
FIG. 6 is a diagram of an integrated circuit surrounded by ambient thermal blocks, in accordance with one or more embodiments.

FIG. 6 is a diagram of an integrated circuit 600 having ambient thermal blocks 601 surrounding the device under test 603, in accordance with one or more embodiments. The device under test 603 includes the same features as integrated circuit 200 (FIG. 2). The ambient circuit blocks 601 are surrounding the device under test 603 and are separated from the device under test 603 by a predetermined distance according to the size of integrated circuit 600. The device under test 603 comprises of circuit components 609 and guard ring 605 which is divided into sections that are configured to be converted to thermal block representations 401 (FIG. 4). The ambient thermal blocks 601 are populated according to the sections 609 and 605 or the thermal block representations 401. The ambient thermal blocks 601 are position outside of the guard ring 605. In some embodiments, the ambient thermal blocks 601 are continuous along one or more edges of the integrated circuit 600. Ambient nodes are positioned at the outer boundaries of the ambient thermal blocks 601 to be used as a node for determining the temperature distribution between a first simulation node and ambient nodes. Because the ambient nodes are set at the ambient temperature surrounding the integrated circuit 600, a thermal distribution between one or more simulation nodes 521 (FIG. 5) and one or more outer nodes 607 illustrates how the heat generated within the integrated circuit travels through the integrated circuit 600 and into the ambient along one or more thermal paths through the various circuit components 201 (FIG. 2) such as through a thermal path 611 that starts at a first simulation node 609 and ends at an outer node 607. The thermal path 611 includes the first simulation node 609, the outer node 607, and any other simulation nodes 521 there between, to determine the temperature distribution along the thermal path 611.

Figure 7:
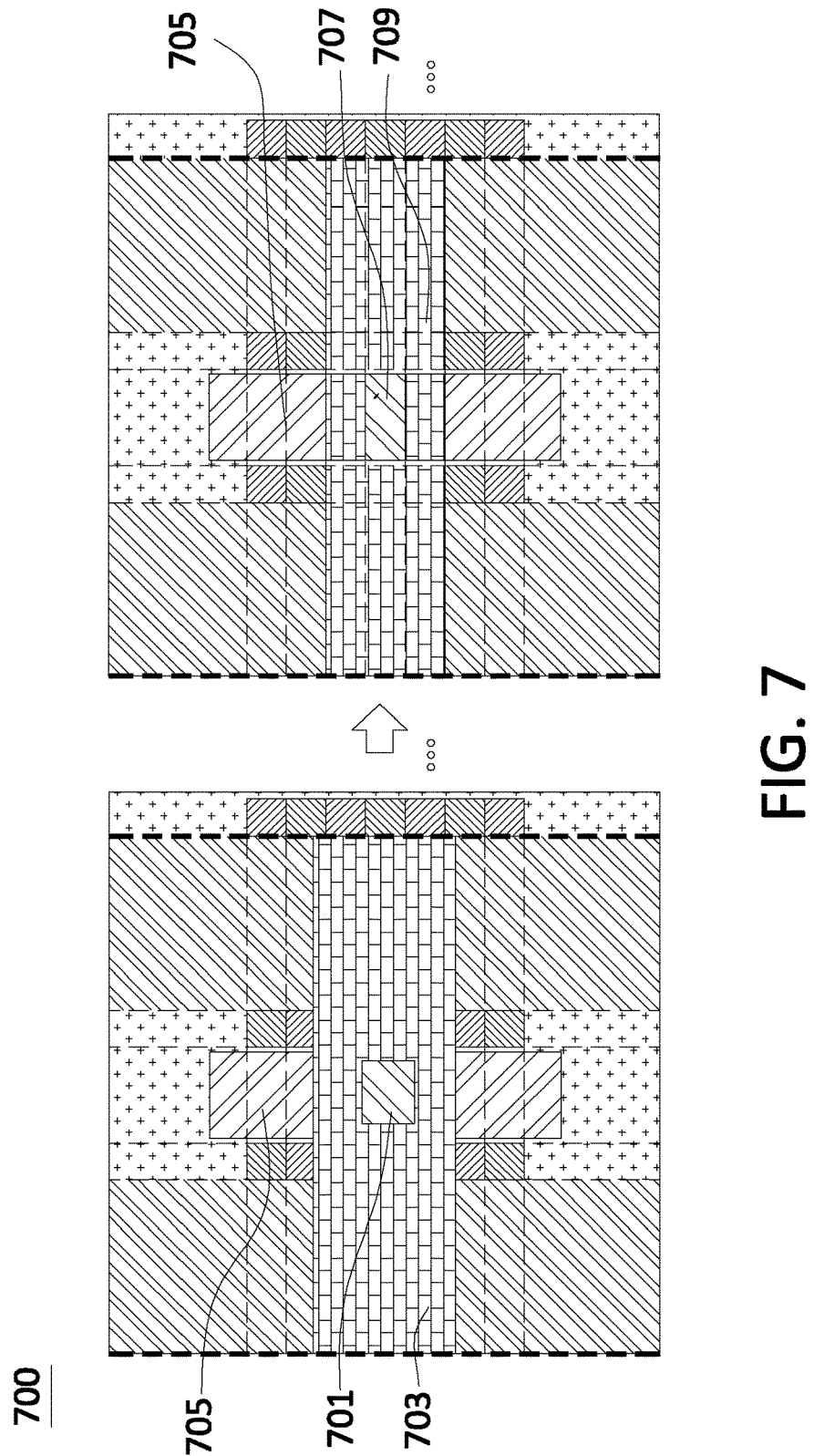
FIG. 7 is a diagram of a thermal block representation re-sizing process, in accordance with one or more embodiments.

FIG. 7 is a diagram of a re-sizing of a thermal block representation in the re-sizing process 700, in accordance with one or more embodiments. The thermal block representation 701 in this example is representative of a via structure such as via 501 (FIG. 5). The thermal block representation 703 is representative of a heat conductive layer such as oxide layer 515 (FIG. 5). The heat dissipation performance platform 103 resizes the thermal block representation 701 and the thermal block representation 703 to align the thermal block representations of the via structure 501 and the oxide layer 515 with the other thermal block representations 705 other sub-components of the circuit component 500 (FIG. 5). For example, a width W of the thermal block representation 701 is re-sized to be equal to a width of a nearby thermal block representation 705. A length L of the thermal block representation 701 is also re-sized to be equal to a length of a different nearby thermal block representation 705. The thermal block representation 701 following the re-sizing process becomes re-sized thermal block representation 707. Similarly, the thermal block representation 703 of the oxide layer 515 has a length that is resized to align with other thermal block representations 705. For example, thermal block representation 703 is re-sized to have a length equal to three nearby thermal block representation 705. But, the thermal block representation 703 is already aligned with two other thermal block representations with respect to a width of the thermal block representation 703. So, the thermal block 703 is re-sized only, in this example, in the length (and optionally a height H) direction, thereby becoming re-sized thermal block representation 709.

To re-size thermal block representations, the heat distribution performance platform 103 uses the following formulas for the x, y and z directions to selectively adjust the length L, the width W, and the height H of the thermal block representation while maintaining an equal thermal mass, or thermal resistance, R, between the thermal block representation and the re-sized thermal block representation. In the following formulas, $\rho$ is the unit thermal resistivity of the thermal block representation, $\rho'$ is the adjusted unit thermal resistivity of the re-sized thermal block representation, $\theta$ is the thermal conductivity through the thermal block representation, $\theta'$ is the adjusted thermal conductivity through the re-sized thermal block representation, L' the re-sized length, W' is the re-sized width, and H' is the re-sized height.

$$R_x = \rho_x \frac{L}{WH} = \rho'_x \frac{L'}{W'H} \Rightarrow \rho'_x = \frac{W'}{W} \times \frac{L}{L'} \times \rho_x \Rightarrow \theta'_x = \quad (3)$$

$$\frac{1}{\rho'_x} = \frac{1}{\rho_x} \times \frac{W}{W'} \times \frac{L'}{L} = \theta_x \times \frac{W}{W'} \times \frac{L'}{L} = \theta_x \times \frac{W}{L} \times \frac{L'}{W'}$$

$$R_y = \rho_y \frac{W}{LH} = \rho'_y \frac{W'}{L'H} \Rightarrow \rho'_y = \frac{W}{W'} \times \frac{L'}{L} \times \rho_y \Rightarrow \theta'_y = \quad (4)$$

$$\frac{1}{\rho'_y} = \frac{1}{\rho_y} \times \frac{W'}{W} \times \frac{L}{L'} = \theta_y \times \frac{W'}{W} \times \frac{L}{L'} = \theta_y \times \frac{L}{W} \times \frac{W'}{L'}$$

$$R_z = \rho_z \frac{H}{LW} = \rho'_z \frac{H}{L'W'} \Rightarrow \rho'_z = \frac{W'}{W} \times \frac{L'}{L} \times \rho_z \Rightarrow \theta'_z = \quad (5)$$

$$\frac{1}{\rho'_z} = \frac{1}{\rho_z} \times \frac{W}{W'} \times \frac{L}{L'} = \theta_z \times \frac{W}{W'} \times \frac{L}{L'} = \theta_z \times \frac{WL}{W'L'}$$

Figure 8:
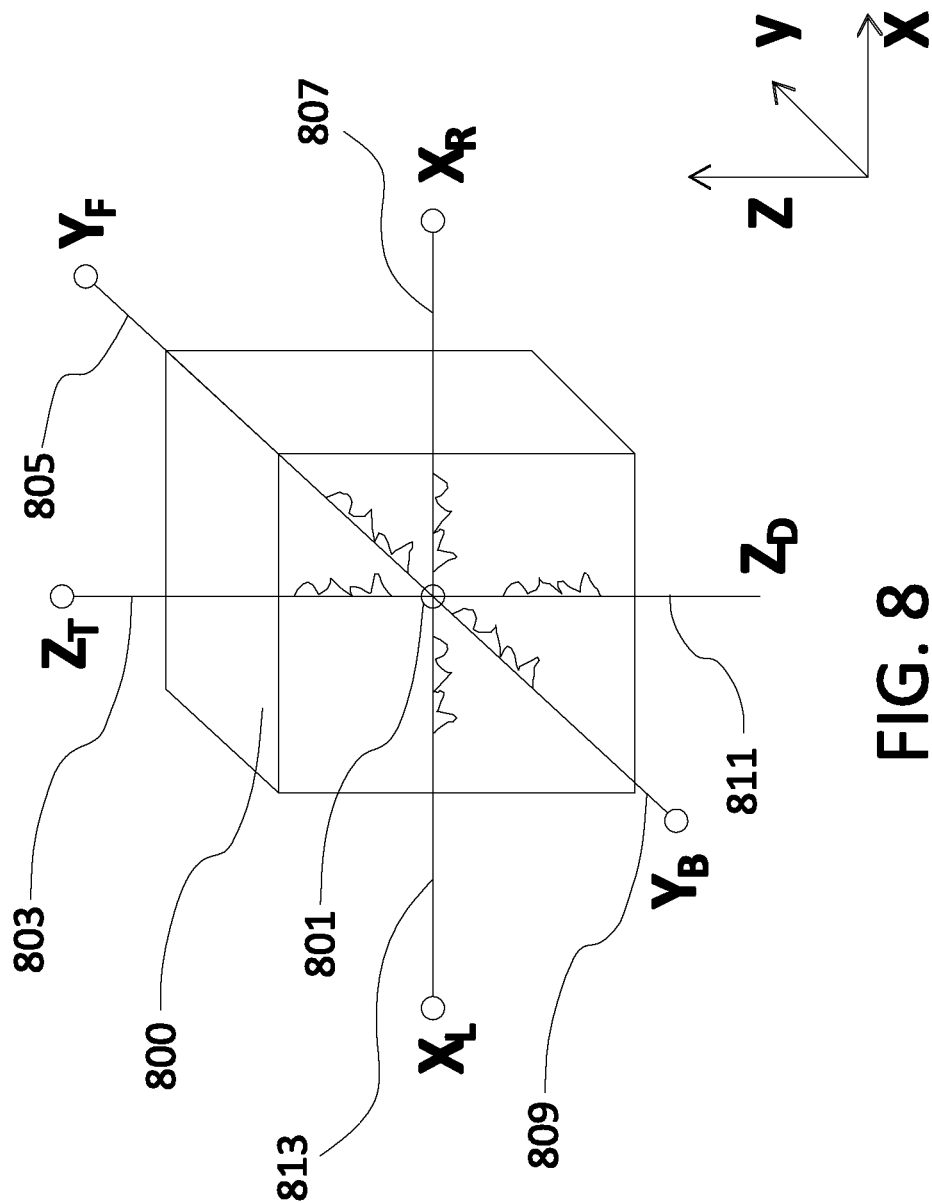
FIG. 8 is a diagram of a cubic thermal block representation, in accordance with one or more embodiments.

FIG. 8 is a diagram of a thermal block representation 800, in accordance with one or more embodiments. The thermal block representation 800 is a cubic thermal block representation to illustrate the three dimensional thermal flow possibilities. Though cubic in this example, a thermal block representation can take any two-dimensional or three-dimensional shape. The thermal block representation 800 is arranged having a first simulation node 801 at the intersection of the x, y and z-axes. The thermal block representation 800 has thermal paths 803, 805, 807, 809, 811, and 813 running along the x, y and z-axes to corresponding simulation nodes $X_L$, $X_R$, $Y_B$, $Y_R$, $Z_T$, and $Z_D$ that are outside of the thermal block representation 800. The simulation nodes $X_L$, $X_R$, $Y_B$, $Y_R$, $Z_T$, and $Z_D$ are, for example, within another thermal block representation, within a substrate thermal block representation, or within an ambient thermal block. Simulation nodes are not limited to being along one of the x, y or z-axes, like simulation nodes $X_L$, $X_R$, $Y_B$, $Y_R$, $Z_T$, and $Z_D$. Accordingly, simulation nodes located off of one or more of the x, y or z-axis with respect to the first simulation node 801 would yield a thermal path that is diagonal with respect to one or more of the x, y, or z-axis.

In some embodiments, the thermal block representation 800 is treated by the heat dissipation performance platform 103 (FIG. 1) as comprising a uniform material or as having uniform thermal properties throughout.

Figure 9:
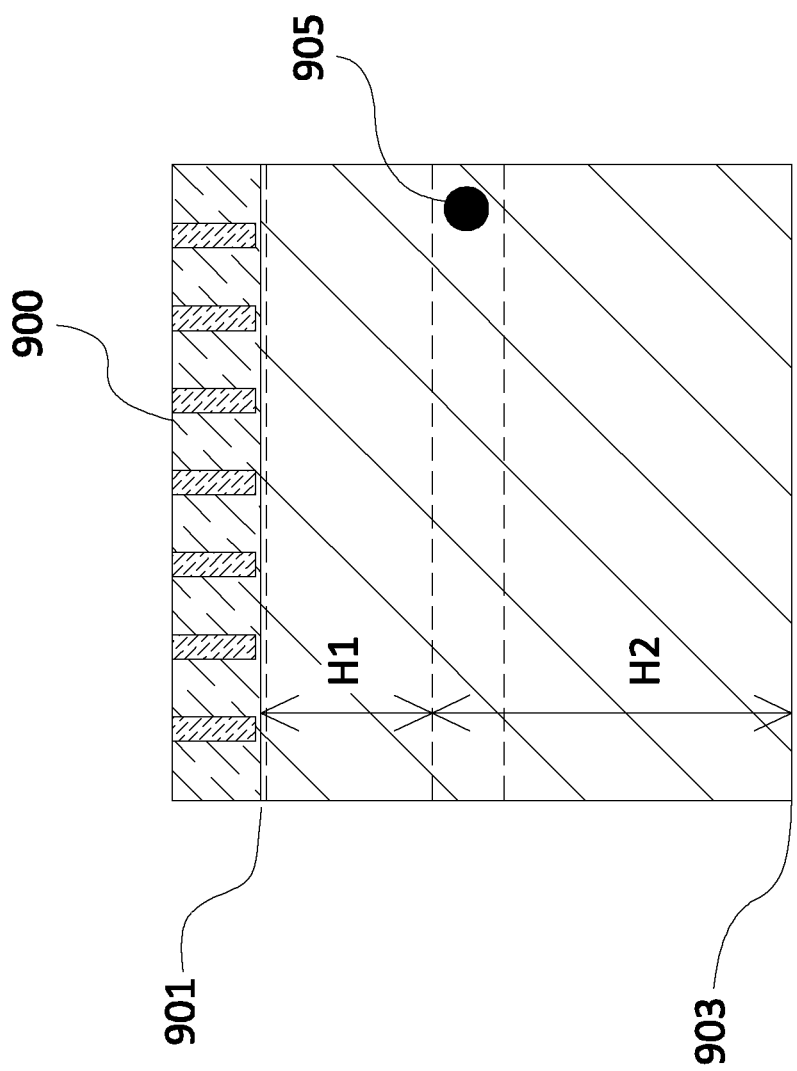
FIG. 9 is a diagram of a substrate thermal block representation, in accordance with one or more embodiments.

FIG. 9 is a diagram of a substrate thermal block representation 900, in accordance with one or more embodiments. The substrate thermal block representation 900 has a device side 901 and a bottom side 903. The substrate thermal block representation 900 has a thickness H1+H2 between the device side 901 and the bottom side 903 of the substrate thermal block representation. One or more substrate nodes 905 are positioned by the heat dissipation performance platform 103 at a position that is greater than or equal to H1 away from the device side 901 of the substrate thermal block representation 900. In some embodiments, H1 is from about 25 micrometers to about 200 micrometers. In some embodiments, H2 is from less than 40 micrometers to greater than 200 micrometers. In some embodiments, if H1+H2 is about 100 micrometers, for example, H1 is about 30 micrometers yields a position for an substrate node 905 where the temperature of the substrate thermal block representation 900 is about equal to the ambient.

FIGS. 10-14 are heat dissipation simulation result outputs generated by the heat dissipation performance platform 103 (FIG. 1), in accordance with one or more embodiments.

Figure 10:
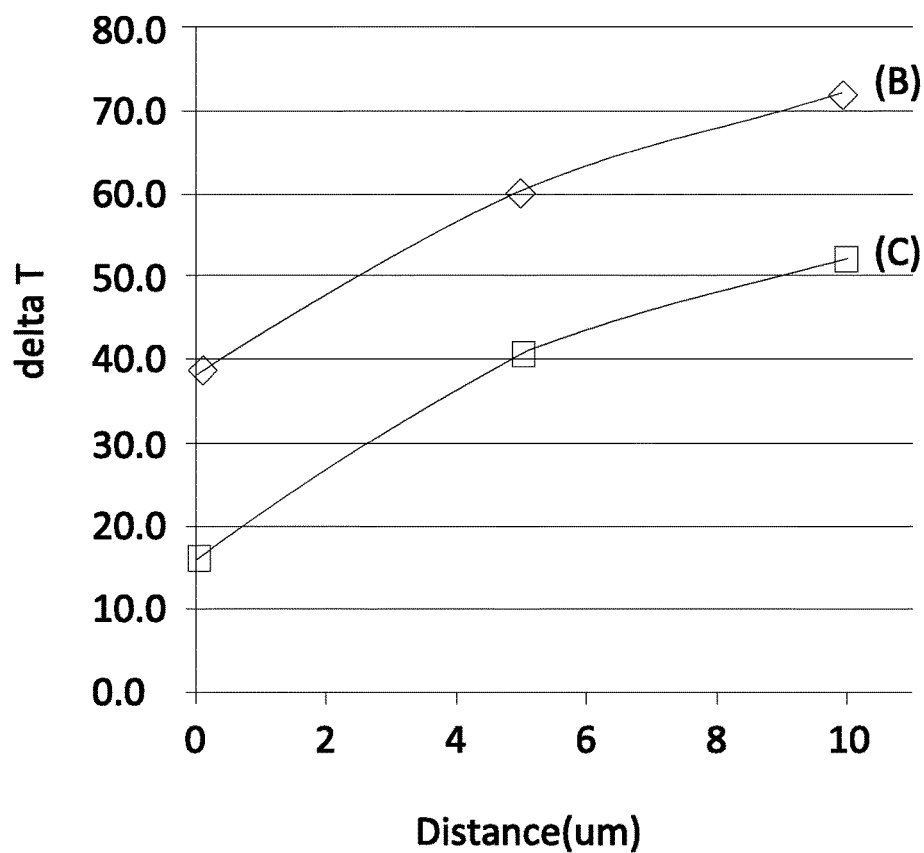
FIG. 10 is a heat dissipation performance simulation output, in accordance with one or more embodiments.

FIG. 10 is a spreadsheet and graphical output of a heat dissipation performance simulation conducted by the heat dissipation performance platform 103 on an integrated circuit having no via holes (A), four vias that are not connected (B), and four vias that are connected (C). The different integrated circuit designs were tested at distances of 0.1 micrometers, 5 micrometers, and 10 micrometers between the via holes for curves (B) and (C). The results table includes values for corresponding locations where the via would have been positioned for no-via-hole test (A), but the results for test (A) are not shown graphically with curves (B) and (C). The change in temperature delta T is determined by the heat dissipation platform 103 based on a difference between a temperature at a first simulation node and a temperature at a second simulation node.

The results in FIG. 10 indicate that the four connected vias are more effective at dissipating heat generated by the integrated circuit, which is apparent in the following FIG. 11. The change in temperature delta T is lower for the connected vias that are closest together compared to the other design options, indicating that heat dissipation is better if the vias are closely positioned.

Figure 11:
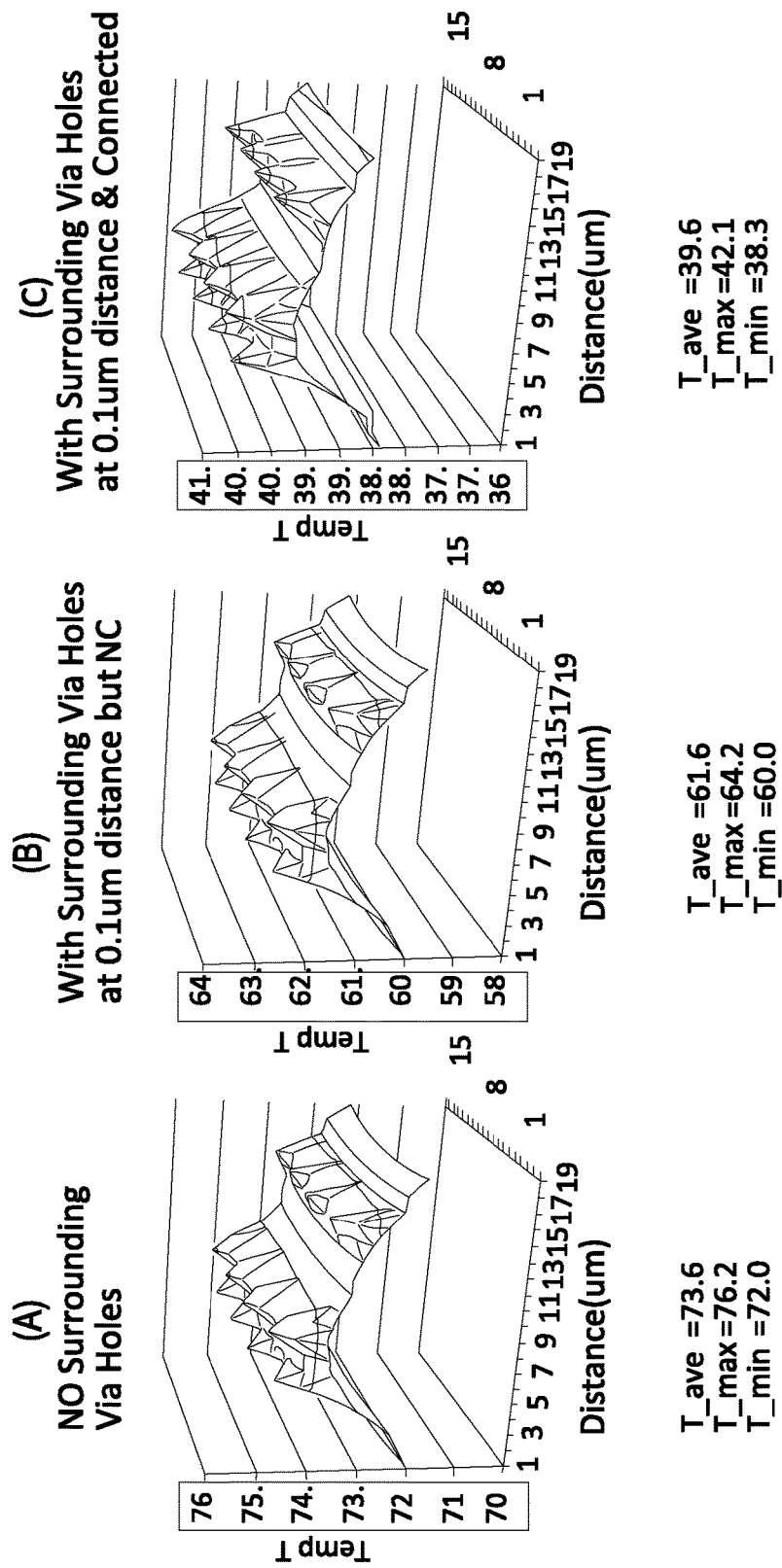
FIG. 11 is a heat dissipation performance simulation output, in accordance with one or more embodiments.

FIG. 11 is a graphical output comparing the temperature distribution through an integrated circuit having no via holes (A), via holes at a distance of 0.1 micrometers that are not connected (B), and via holes at a distance of 0.1 micrometers that are connected (C), as a distance from a first simulation node increases. The graphical outputs shown in FIG. 11 include temperature values determined at various simulation nodes mapping a temperature distribution profile through the integrated circuit under test. The labels on the x-axis mark the equally spaced simulation nodes within the circuit components.

Figure 12:
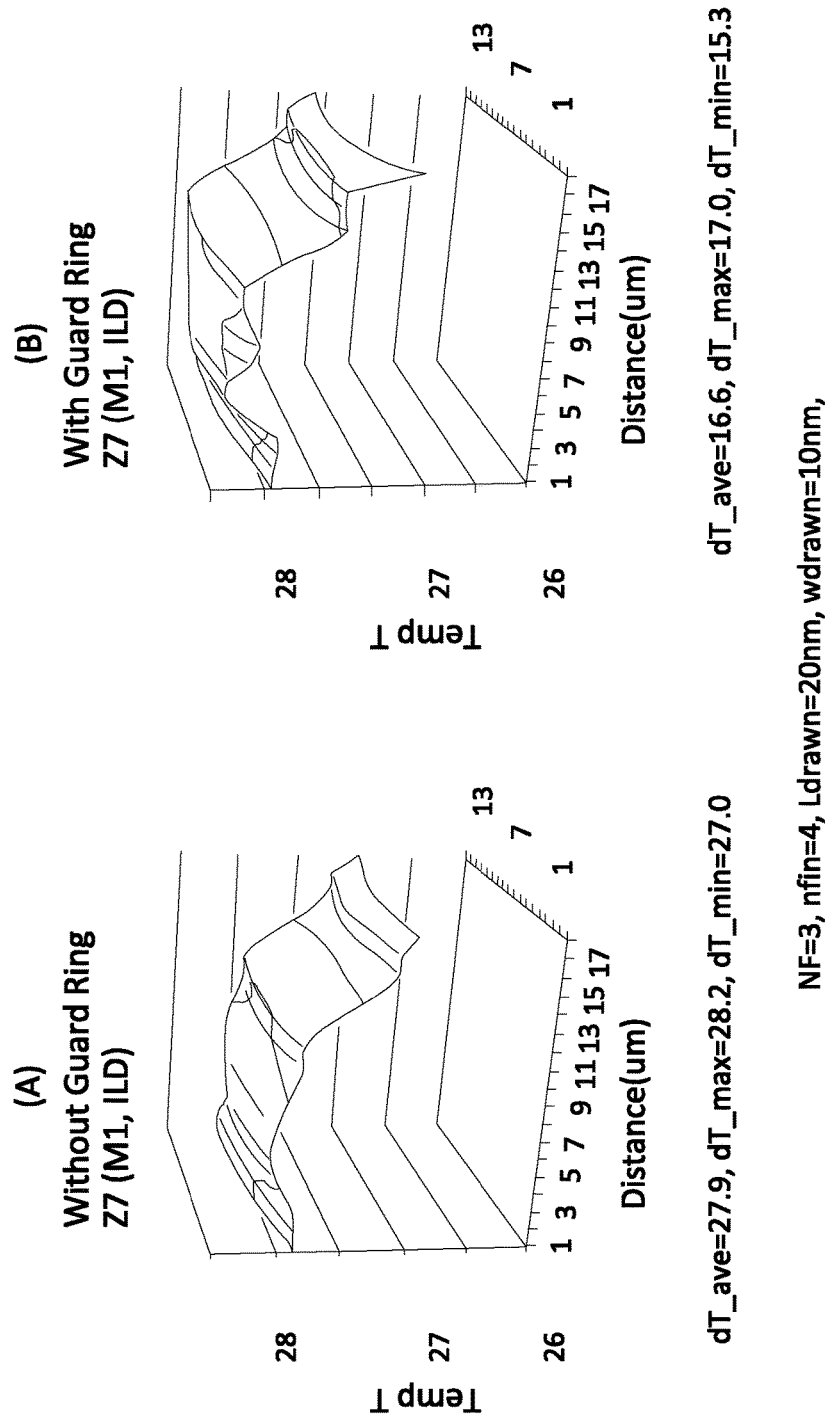
FIG. 12 is a heat dissipation performance simulation output, in accordance with one or more embodiments.

FIG. 12 is a graphical output comparing the temperature distribution through an integrated circuit without a guard ring (A) and with a guard ring (B) as a distance from a first simulation node increases. The graphical outputs shown in FIG. 12 include change in temperature values delta T determined at various simulation nodes mapping a temperature distribution profile through the integrated circuit under test. The temperature distribution profile illustrated in FIG. 12, for example, is limited to thermal paths that occur, for example, in a metal layer of the integrated circuit. The labels on the x-axis mark the equally spaced simulation nodes within the circuit components.

Figure 13:
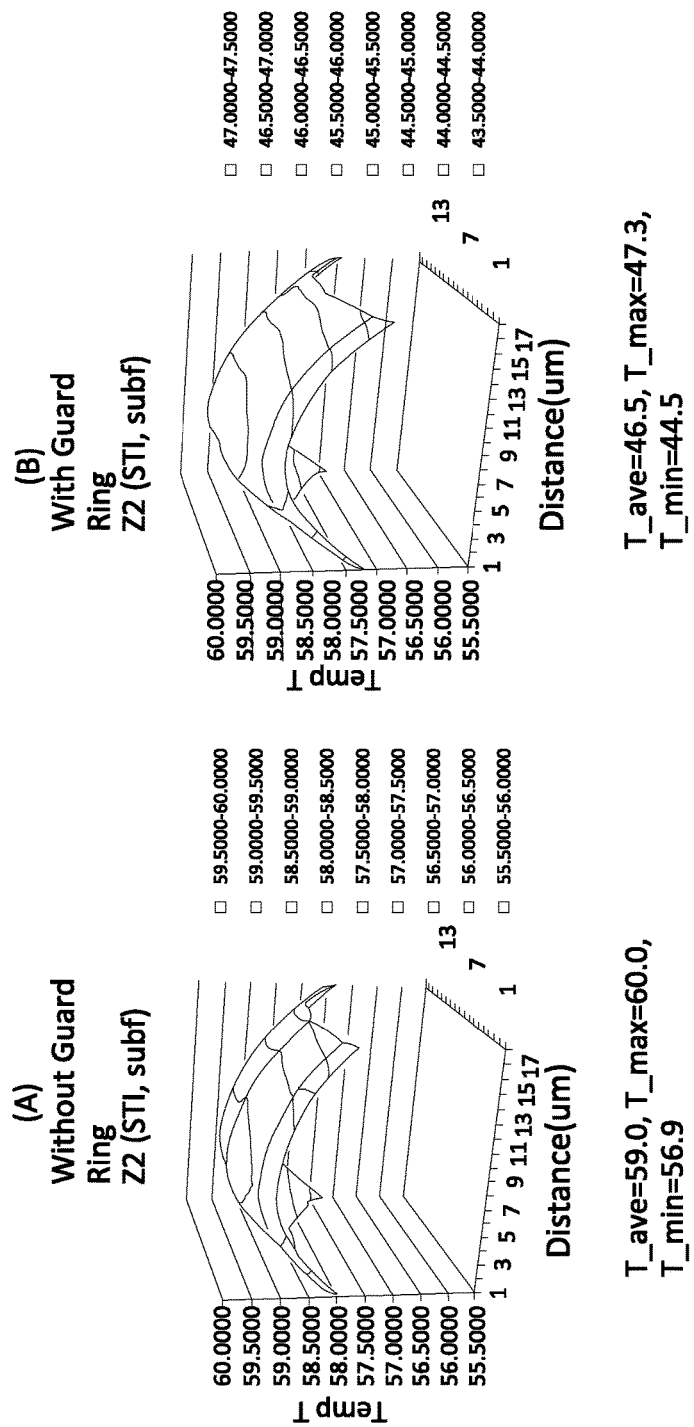
FIG. 13 is a heat dissipation performance simulation output, in accordance with one or more embodiments.

FIG. 13 is a graphical output comparing the temperature distribution through an integrated circuit without a guard ring (A) and with a guard ring (B) as a distance from a first simulation node increases. The graphical outputs shown in FIG. 13 include temperature values determined at various simulation nodes mapping a temperature distribution profile through the integrated circuit under test. The temperature distribution profile illustrated in FIG. 13, for example, is limited to thermal paths that occur, for example, in a shallow trench isolation feature of the integrated circuit. The labels on the x-axis mark the equally spaced simulation nodes within the circuit components.

Figure 14:
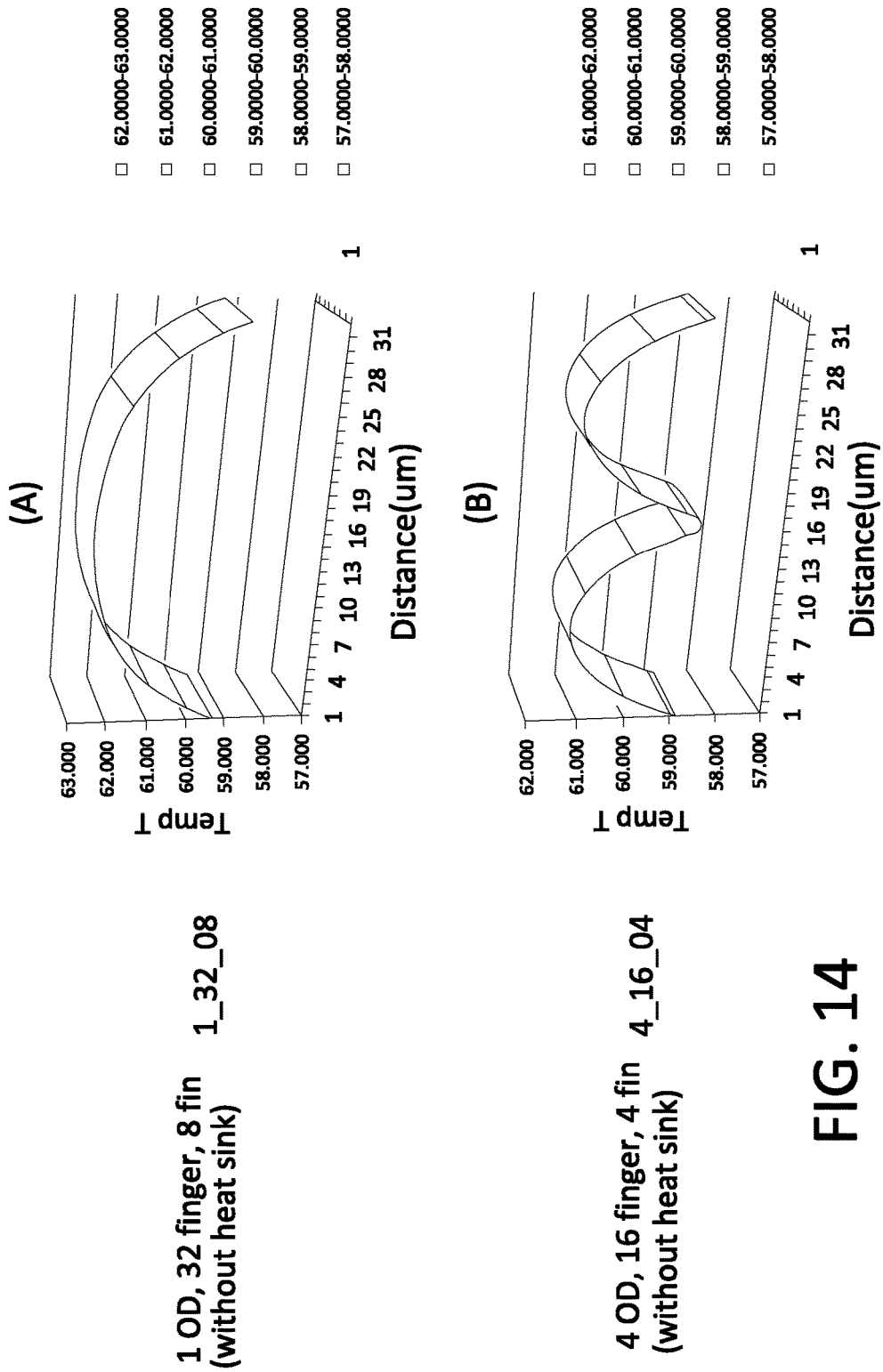
FIG. 14 is a heat dissipation performance simulation output, in accordance with one or more embodiments.

FIG. 14 is a graphical output comparing the temperature distribution through differently designed integrated circuits (1 OD, 32 finger, 8 fins—plot (A) versus 4 OD, 16 fingers, 4 fins plot (B)) that are designed without a heat sink as a distance from a first simulation node increases. The graphical outputs shown in FIG. 14 include temperature values determined at various simulation nodes mapping a temperature distribution profile through the integrated circuit under test. The temperature distribution profile illustrated in FIG. 14, for example, is limited to thermal paths that occur, for example, in the fin layer for the one-oxide-layer island structure versus four-oxide-layer island structure while the integrated circuit has a variation in number of extensions or fingers and fins. The labels on the x-axis mark the equally spaced simulation nodes within the circuit components.

FIG. 15 is a diagram of a user interface 1500, in accordance with one or more embodiments. The component parameters are one or more of input by way of user interface 1500 or extracted from an integrated circuit that is to be subjected to the heat dissipation performance platform 103 (FIG. 1). The user interface 1500 includes component parameters, a netlist, an indication of the device under test, a power setting that translates the power supplied to the integrated circuit under test to a pseudo voltage source which will drive the voltage-controlled current sources in the heat dissipation platform 103 (FIG. 1), and a designation of which features of the integrated circuit are to be converted to thermal block representations and processed for heat dissipation performance.

The processes described herein for determining a temperature distribution through an integrated circuit are implemented via software in combination with hardware or firmware, hardware, firmware or a combination of software and firmware and/or hardware. For example, the processes described herein, may be advantageously implemented via a processor, Digital Signal Processing (DSP) chip, an Application Specific Integrated Circuit (ASIC), Field Programmable Gate Arrays FPGAs, etc. Such exemplary hardware for performing the described functions is detailed below.

Figure 16:
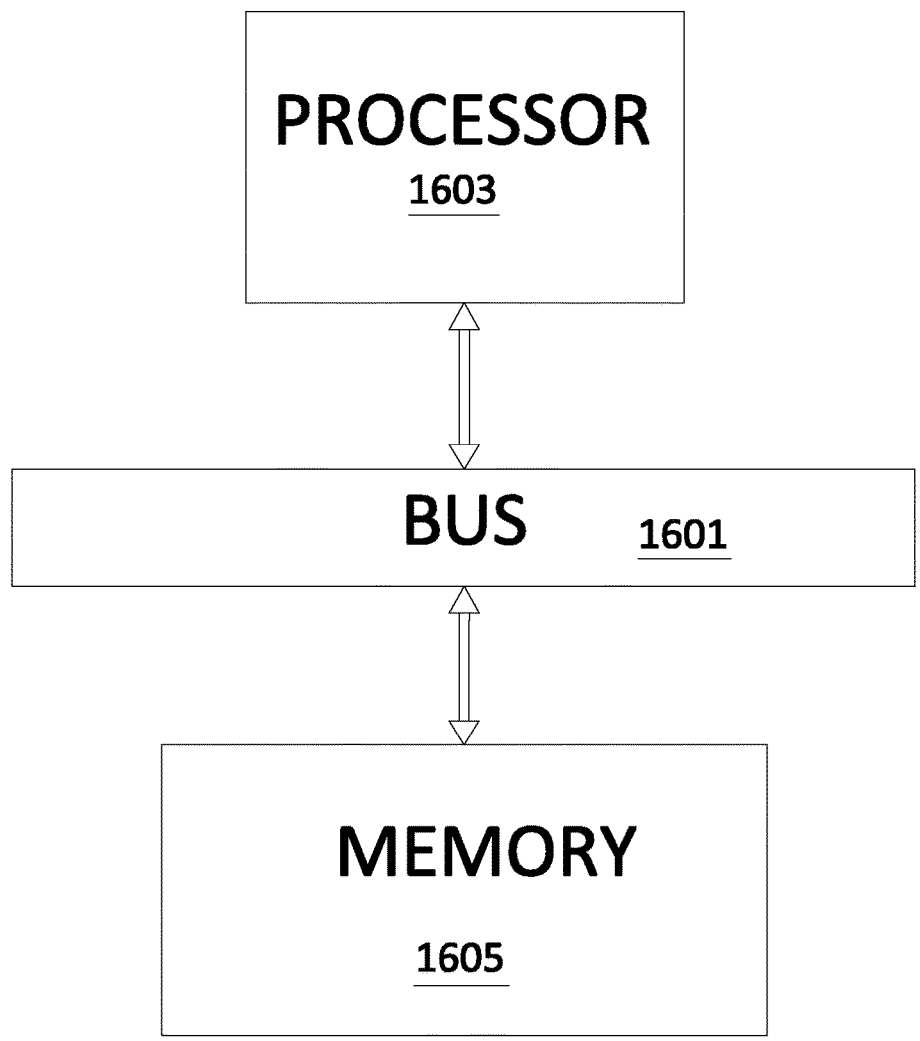
FIG. 16 is a diagram of a chip set by which an embodiment is implemented.

FIG. 16 is a functional block diagram of a computer or processor-based system 1600 upon which or by which an embodiment is implemented.

Processor-based system 1600 is programmed to determine a temperature distribution through an integrated circuit, as described herein, and includes, for example, bus 1601, processor 1603, and memory 1605 components. In some embodiments, the processor-based system is implemented as a single "system on a chip." Processor-based system 1600, or a portion thereof, constitutes a mechanism for performing one or more steps of determining a temperature distribution through an integrated circuit.

In some embodiments, the processor-based system 1600 includes a communication mechanism such as bus 1601 for transferring information and/or instructions among the components of the processor-based system 1600. Processor 1603 is connected to the bus 1601 to obtain instructions for execution and process information stored in, for example, the memory 1605. In some embodiments, the processor 1603 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1603. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 1603 performs a set of operations on information as specified by a set of instructions stored in memory 1605 related to determining a temperature distribution through an integrated circuit. The execution of the instructions causes the processor to perform specified functions.

The processor 1603 and accompanying components are connected to the memory 1605 via the bus 1601. The memory 1605 includes one or more of dynamic memory (e.g., RAM, magnetic disk, writable optical disk, etc.) and static memory (e.g., ROM, CD-ROM, etc.) for storing executable instructions that when executed perform the steps described herein to determine a temperature distribution through an integrated circuit. The memory 1605 also stores the data associated with or generated by the execution of the steps.

In one or more embodiments, the memory 1605, such as a random access memory (RAM) or any other dynamic storage device, stores information including processor instructions for determining a temperature distribution through an integrated circuit. Dynamic memory allows information stored therein to be changed by system 100. RAM allows a unit of information stored at a location called a memory address to be stored and retrieved independently of information at neighboring addresses. The memory 1605 is also used by the processor 1603 to store temporary values during execution of processor instructions. In various embodiments, the memory 1605 is a read only memory (ROM) or any other static storage device coupled to the bus 1601 for storing static information, including instructions, that is not changed by the system 100. Some memory is composed of volatile storage that loses the information stored thereon when power is lost. In some embodiments, the memory 1605 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 1603, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description relates to a method that comprises constructing thermal block representations of one or more circuit components or one or more sub-components of the one or more circuit components in an integrated circuit based, at least in part, on defined component parameters. The component parameters describe the one or more sub-components of the one or more circuit components. The thermal block representations have at least one simulation node. The method also comprises supplying a current using at least one current source or one voltage controlled current source in a performance simulation. The current is supplied to a thermal path between a first simulation node and a second simulation node. The method further comprises determining a temperature distribution between the first simulation node and the second simulation node based on the current, a first determined voltage at the first simulation node, and a second determined voltage at the second simulation node.

Another aspect of this description relates to an apparatus comprising at least one processor and at least one memory including computer program code for one or more programs. The at least one memory and the computer program code configured to, with the at least one processor, cause the apparatus to construct thermal block representations of one or more circuit components or one or more sub-components of the one or more circuit components in an integrated circuit based, at least in part, on defined component parameters. The component parameters describe the one or more sub-components of the one or more circuit components. The thermal block representations have at least one simulation node. The apparatus is also caused to supply a current using at least one current source or one voltage controlled current source in a performance simulation. The current is supplied to a thermal path between a first simulation node and a second simulation node. The apparatus is further caused to determine a temperature distribution between the first simulation node and the second simulation node based on the current, a first determined voltage at the first simulation node, and a second determined voltage at the second simulation node.

A further aspect of this description relates to a non-transitory computer-readable storage medium carrying computer-readable instructions which, when executed by one or more processors, cause an apparatus to construct thermal block representations of one or more circuit components or one or more sub-components of the one or more circuit components in an integrated circuit based, at least in part, on defined component parameters. The component parameters describe the one or more sub-components of the one or more circuit components. The thermal block representations have at least one simulation node. The apparatus is also caused to supply a current using at least one voltage controlled current source in a performance simulation. The current is supplied to a thermal path between a first simulation node and a second simulation node. The apparatus is further caused to determine a temperature distribution between the first simulation node and the second simulation node based on the current, a first determined voltage at the first simulation node, and a second determined voltage at the second simulation node.

The foregoing outlines sub-components of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   constructing thermal block representations of one or more circuit components or one or more sub-components of the one or more circuit components in an integrated circuit based, at least in part, on defined component parameters, the component parameters describing the one or more sub-components of the one or more circuit components, the thermal block representations including a plurality of simulation nodes, each simulation node of the plurality of simulation nodes indicating a physical position within the one or more circuit components;

supplying a current using at least one current source to represent heat flow from one or more locations in a performance simulation, the current being supplied to a thermal path between a first simulation node of the plurality of simulation nodes and a second simulation node of the plurality of simulation nodes;

determining a temperature distribution between the first simulation node and the second simulation node based on the current, a first determined voltage at the first simulation node, and a second determined voltage at the second simulation node;

based on the determined temperature distribution, selecting the one or more circuit components or one or more sub-components of the one or more circuit components in a design of the integrated circuit, the design of the integrated circuit corresponding to the component parameters; and performing one or more of a lithographic process, a growing process, or an etching process based on the design of the integrated circuit.

2. The method of claim 1, wherein the defined component parameters comprise one or more of a quantity, a length, a width, a height, a material, or a k-value.

3. The method of claim 1, wherein the constructing the thermal block representations comprises:

establishing a component boundary associated with the one or more circuit components or the one or more sub-components, the one or more sub-components being within the component boundary for a respective circuit component of the one or more circuit components;

reducing a quantity of the one or more sub-components of the one or more circuit components; and representing the one or more circuit components having the reduced quantity of sub-components within the established component boundary associated with the one or more circuit components.

4. The method of claim 3, wherein the constructing the thermal block representations further comprises:

re-sizing at least one thermal block representation of the one or more circuit components or the one or more sub-components, the re-sizing either expanding or contracting the established component boundary associated with the at least one re-sized thermal block representation to align the at least one re-sized established component boundary of the at least one thermal block representation with at least one other established component boundary of another circuit component or another sub-component of the one or more circuit components or the one or more sub-components.

5. The method of claim 1, further comprising:
connecting the thermal block representations;
wherein the first simulation node is in a first thermal block representation, and the second simulation node is in a second thermal block representation.

6. The method of claim 5, further comprising:
generating a connection list comprising one or more connections between the connected thermal block representations.

7. The method of claim 6, further comprising:
generating a circuit view of the integrated circuit based on the connection list.

8. The method of claim 1, wherein the first simulation node indicates a position of a drain junction of the integrated circuit.

9. The method of claim 8, wherein the integrated circuit is a field effect transistor comprising a source, a drain having the drain junction, and a fin over a substrate.

10. The method of claim 8, wherein the integrated circuit is surrounded, in the performance simulation, by one or more ambient thermal blocks representative of an ambient environment around the integrated circuit, a default temperature at outer boundaries of the one or more ambient thermal blocks being set at an ambient temperature.

11. The method of claim 10, wherein the integrated circuit is over a substrate, the substrate is represented by a corresponding substrate thermal block representation, an ambient node of the substrate thermal block representation is set at the ambient temperature, and the ambient node is located at the outer boundaries of the substrate thermal block representation at a position that is greater than or equal to 30 micrometers from a device-side surface of the substrate thermal block representation.

12. The method of claim 1, wherein the temperature distribution is determined between the plurality of simulation nodes, the temperature distribution being based on the current and a plurality of determined voltages including the first determined voltage and the second determined voltage.

13. The method of claim 1, wherein the one or more circuit components comprise one or more electrically conductive circuit components and at least one thermal path is independent of the one or more electrically conductive circuit components.

14. The method of claim 1, further comprising:
mapping the temperature distribution between the plurality of simulation nodes with respect to a distance from the physical position indicated by the first simulation node, the mapping being displayed graphically.

15. The method of claim 1, wherein the determining the temperature distribution between the first simulation node and the second simulation node comprises:
representing a first temperature with the first determined voltage at the first simulation node; and
representing a second temperature with the second determined voltage at the second simulation node.

16. A method comprising:
using at least one processor, causing an apparatus to:
receive, via a user interface of the apparatus, component parameters describing one or more sub-components of one or more circuit components of an integrated circuit;
construct thermal block representations of the one or more circuit components or the one or more sub-components of the one or more circuit components based, at least in part, on the component parameters, the thermal block representations including a plurality of simulation nodes, each simulation node of the plurality of simulation nodes indicating a physical position within the one or more circuit components;
represent heat flow as a current by applying at least one current source at one or more locations in a performance simulation, the current being supplied to a thermal path between a first simulation node of the plurality of simulation nodes and a second simulation node of the plurality of simulation nodes; and
determine a temperature distribution between the first simulation node and the second simulation node based on the current, a first determined voltage at the first simulation node, and a second determined voltage at the second simulation node;

based on the determined temperature distribution, selecting the one or more circuit components or one or more sub-components of the one or more circuit components in a design of the integrated circuit, the design of the integrated circuit corresponding to the component parameters; and performing one or more of a lithographic process, a growing process, or an etching process based on the design of the integrated circuit.

17. The method of claim 16, wherein the constructing the thermal block representations comprises causing the apparatus to:

establish a component boundary associated with the one or more circuit components or the one or more sub-components, the one or more sub-components being within the component boundary for a respective circuit component of the one or more circuit components;

reduce a quantity of the one or more sub-components of the one or more circuit components; and represent the one or more circuit components having the reduced quantity of sub-components within the established component boundary associated with the one or more circuit components.

18. The method of claim 16, wherein the determining the temperature distribution comprises determining the temperature distribution between the plurality of simulation nodes based on the current and a plurality of determined voltages including the first determined voltage and the second determined voltage.

19. A method comprising:

extracting one or more component parameters from an integrated circuit design, the component parameters describing one or more sub-components of one or more circuit components of the integrated circuit;

constructing thermal block representations of the one or more circuit components or the one or more sub-components of the one or more circuit components based, at least in part, on the component parameters, the thermal block representations including a first simulation node and a second simulation node, each simulation node of the first simulation node and the second simulation node indicating a physical position within the one or more circuit components;

applying at least one current source to represent heat flow from one or more locations in a performance simulation, the current being supplied to a thermal path between the first simulation node and the second simulation node;

determining a temperature distribution between the first simulation node and the second simulation node based on the current, a first determined voltage at the first simulation node, and a second determined voltage at the second simulation node;

based on the determined temperature distribution, selecting the one or more circuit components or one or more sub-components of the one or more circuit components in a design of the integrated circuit, the design of the integrated circuit corresponding to the component parameters; and performing one or more of a lithographic process, a growing process, or an etching process based on the design of the integrated circuit.

20. The method of claim 19, wherein constructing the thermal block representations comprises:

establishing a component boundary associated with the one or more circuit components or the one or more sub-components, the one or more sub-components being within the component boundary for a respective circuit component of the one or more circuit components;

reducing a quantity of the one or more sub-components of the one or more circuit components; and representing the one or more circuit components having the reduced quantity of sub-components within the established component boundary associated with the one or more circuit components.

* * * * *